US006901332B2

United States Patent
Hill (10) Patent No.: US 6,901,332 B2
(45) Date of Patent: May 31, 2005

(54) TECHNIQUE FOR VELOCITY ANALYSIS (75) Inventor: David Ian Hill, Sunbury on Thames (GB)

(73) Assignee: Western Geco, L.L.C., Houston, TX (US)

( * ) Notice: Subject to any disclaimer, the term of this patent is extended or adjusted under 35 U.S.C. 154(b) by 51 days.

(21) Appl. No.: 10/302,736

(22) Filed: Nov. 22, 2002

(65) Prior Publication Data

US 2004/0102902 A1 May 27, 2004

(51) Int. Cl.[7] .................................................. G01V 1/28
(52) U.S. Cl. ........................................................ 702/16
(58) Field of Search .............................. 702/14, 16, 17, 702/18; 367/73

(56) References Cited

U.S. PATENT DOCUMENTS 6,493,634 B1 * 12/2002 Krebs et al. ................... 702/14
6,573,855 B1 * 6/2003 Hayakawa et al. ........... 702/14

OTHER PUBLICATIONS

Oz Yilmaz, Irfan Tanir, Cyril Gregory, and Fugen Zhou, "Interpretive Imaging Of Seismic Data", *The Leading Edge*, Feb. 2001, pp. 132, 133, 136, 138, 139, 142, 144.

* cited by examiner

*Primary Examiner*—Donald McElheny, Jr.
(74) *Attorney, Agent, or Firm*—Moser, Patterson & Sheridan (57) ABSTRACT

The present invention relates to a method and article of manufacture of processing seismic data and provides techniques for building and verifying velocity fields using velocity worms in a visualization environment.

27 Claims, 7 Drawing Sheets (6 of 7 Drawing Sheet(s) Filed in Color)

TECHNIQUE FOR VELOCITY ANALYSIS

FIELD OF THE INVENTION

The present invention relates to a method of processing seismic data and provides techniques for building and verifying velocity fields.

BACKGROUND OF THE INVENTION

Seismic data collected on land, at sea, or on the seabed forms an integral part of oil exploration. Seismic data comprises a wavefield generated from a seismic source or sources traveling downward through the earth, being reflected back to the earth's surface from rock strata, then being recorded onto digital tape via a seismic receiver or receivers. The digitally-recorded seismic data is then passed through various algorithms or processes in a computer to build a digital image or model of the earth's subsurface.

In order to build an accurate image or model of the earth's subsurface from the recorded seismic data, an accurate knowledge of the velocity at which the wavefield travels through the various rock strata is needed. This knowledge of the velocity in the rock strata can be gained from the recorded seismic data itself according to various techniques.

Having acquired the relevant knowledge of velocity, velocity fields are derived. The velocity fields are necessary for the various processes that need to be applied to the seismic data in order to build the digital image or model of the earth's subsurface. Various methodologies exist to derive the velocity fields having once measured the velocities. For example, two previously published articles describe a methodology to derive a pre-stack time and/or depth migration velocity field from constant velocity pre-stack time migrated data cubes. (See, *Interpretive Imaging Of Seismic Data*, Yilmaz et al., Leading Edge (February 2001) and *Seismic Data Analysis-Processing, Inversion, And Interpretation Of Seismic Data*, Yilmaz, SEG (2001).)

The ever-continuing requirement for reduced process turn-around and early delivery of the digital image or model of the earth's subsurface has led to improvements in the production workflow for velocity field derivation. It is of interest in the art to develop improved methods of seismic data processing using velocity field derivation.

SUMMARY OF THE INVENTION

The present invention provides methods for velocity field determination using velocity worms in a visualization environment. Advantages of the invention include: the methods of the present invention are general and applicable to the derivation of many forms of velocity fields; multiple three-dimensional data volumes and attributes may be used and viewed simultaneously in a visualization environment; visualization technologies are used to display three-dimensional data volumes in such a way that desired velocity worms are isolated visually; additional quality control products are generated in the same visualization environment (including but not limited to interval or average velocity overlays and "best stack" data from the derived velocity worm velocities); the velocity worms can be tracked within the visualization environment through multiple three-dimensional data volumes in a number of directions; and the velocity worms can be tracked within the visualization environment in four-dimensions to give a "velocity worm surface" or surfaces of velocities for the target processes that need to be applied to the seismic data in order to build the digital image or model of the earths subsurface.

Thus, the present invention provides methods for deriving a velocity field for a geophysical application, comprising analyzing the raw seismic data to produce pilot velocity fields, and pre-computing additional seismic data using these pilot velocity fields. Such seismic data can be velocity stack data, attributes derived from velocity stack data, semblance data or attributes derived from semblance data. Once the seismic data are pre-computed, it is imported into a visualization environment. Once in the visualization environment, the seismic data is displayed such that velocity worms are visualized hanging in a multi-dimensional space. The velocity worms are then tracked along their length within the visualization environment. From the tracked worms, a multi-dimensional velocity field for a geophysical application is derived.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The teaching of the present invention readily can be understood by considering the following detailed description in conjunction with the accompanying drawings.

DETAILED DESCRIPTION OF THE INVENTION

As stated, it is of interest in the art to develop improved methods of seismic data processing using velocity field derivation (the phrase "velocity field" and "velocity model"

are equivalent for the purposes of the following text and can be used interchangeably). One such improvement is using "velocity worm" technology. In addition to decreased product turn-around, the use of velocity worms provides enhanced quality control of derived velocity fields. In the present invention, methods are provided for using velocity worms in a visualization environment. The methods include choosing a number of pilot velocity functions or fields that span the range of velocities to be analyzed. Next, multi-attribute data, including but not limited to velocity function stack cubes, semblance cubes, amplitude cubes and other derivative attributes, are precomputed. All attributes are then loaded into a graphics computer such that they all simultaneously reside in a three-dimensional (comprising a single space axis, a time or depth axis and a velocity axis) or four-dimensional (comprising two space axes, a time or depth axis and a velocity axis) visualization environment.

Moreover, in the present invention one or more of these attributes can be rendered or displayed in such a way that a continuous or semi continuous elongate attribute cloud corresponding to the desired stacking, migration or other velocity can be visually identified. This elongate attribute cloud is given the term velocity worm.

The velocity worm can be tracked along its length in a three-dimensional space or tracked over a surface in a four-dimensional space, and, subsequently, velocity worm validity can be verified by cross-reference to the other data volumes within the visualization environment. Generally, tracking means following an event, for example, a velocity worm, in a multi-dimensional space in order to determine the coordinates of the event's trajectory through that space. Tracking may be done manually, where user-selected points along the event are connected, usually in a straight line or in a stream-mode where points are recorded as the user tracks a cursor along the event. Alternatively, auto-tracking may be done where a user-specified attribute of the event (such as local minimum amplitude or local maximum amplitude) is followed using a computer algorithm. In one aspect of the present invention, the velocity worms can be auto-tracked in three dimensions using a 3D conjugate gradient algorithm, and velocity worm surfaces can be tracked in four dimensions using a 4D conjugate gradient algorithm. The validity of the velocity derived from the tracked velocity worm can be augmented further by derivation in the visualization environment of additional attributes from these velocity worms in the form of interval or average velocity displays and additional stacked datasets.

As noted above, two previously published articles describe a methodology to derive a pre-stack time and/or depth migration velocity field from constant velocity pre-stack time migrated data cubes. (See, *Interpretive Imaging Of Seismic Data*, Yilmaz et al., Leading Edge (February 2001) and *Seismic Data Analysis-Processing, Inversion, And Interpretation Of Seismic Data*, Yilmaz, SEG (2001).) The second publication is a more in-depth version of the first. However, a significant difference between the published methodologies and the methodology outlined herein is that the published articles limit the method to the derivation of migration velocity fields, whereas the present invention derives a range of velocity fields for a variety of purposes. Another significant difference is that the published references require that the primary data used be constant-velocity, pre-stack, time-migrated data, whereas the present invention has no such limitation and may include secondary attributes derived from the primary attributes. Finally, in the published references, there is a limit of one data volume in the visualization environment, whereas the present invention has no such limitations.

An illustrative but not exhaustive list of geophysical applications for velocity fields derived using velocity worm technology are: migration velocity fields for either pre- or post- stack time or depth migration; stacking velocity fields or residual stacking velocity fields for stacking pre-stack data with or without pre-stack migration applied; anisotropic velocity fields or anisotropic parameter fields; velocity fields for pore-pressure prediction; and velocity models for acoustic or elastic impedance inversion.

Figure 1:
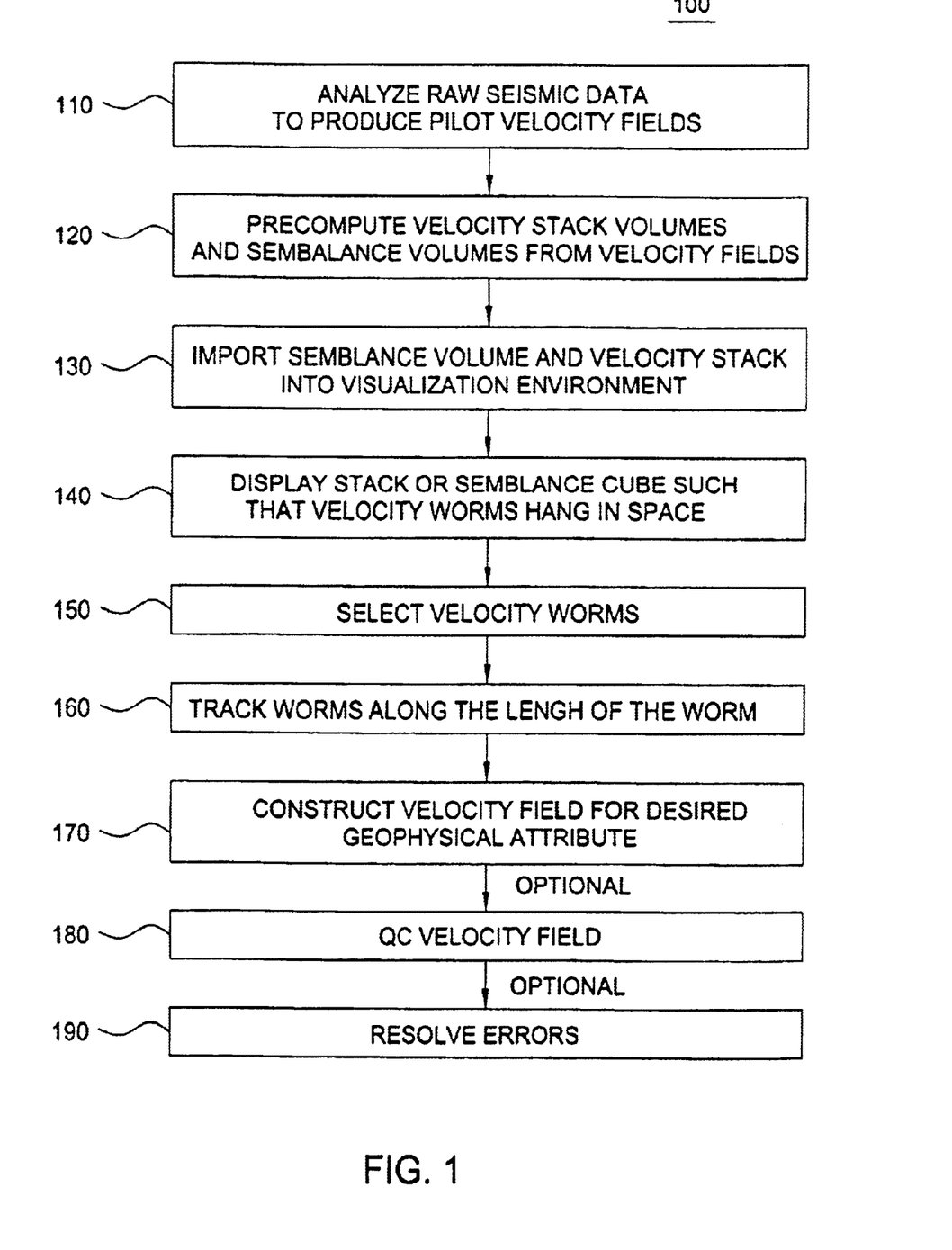
FIG. 1 is a flow diagram of one embodiment of the methods of the present invention.

FIG. 1 is a flow diagram of one embodiment of the methods of the present invention. In method 100, raw seismic data is analyzed to produce pilot velocity fields (step 110), and velocity stack volumes and semblance volumes are precomputed with those pilot velocity fields (step 120). The semblance volume and velocity stack are imported into a visualization environment (step 130), where a stack and/or semblance cube is displayed such that velocity worms appear to hang in space within the visualization environment (step 140). Velocity worms of interest corresponding to either stacking velocities, multiple velocities or anisotropic parameters are selected (step 150) and tracked along their length (step 160), until a velocity field for the desired geophysical application is constructed (step 170). Optionally, once the velocity worms have been interpreted, quality control may be applied in a number of ways. The validity of the velocity derived from the tracked velocity worm can be instantly verified by cross-reference to the other data volumes within the visualization environment and further augmented by the derivation within the visualization environment of additional attributes from these velocity worms in the form of interval or average velocity displays and additional stacked datasets (step 180). Any identified errors can then be resolved (step 190).

Figure 2:
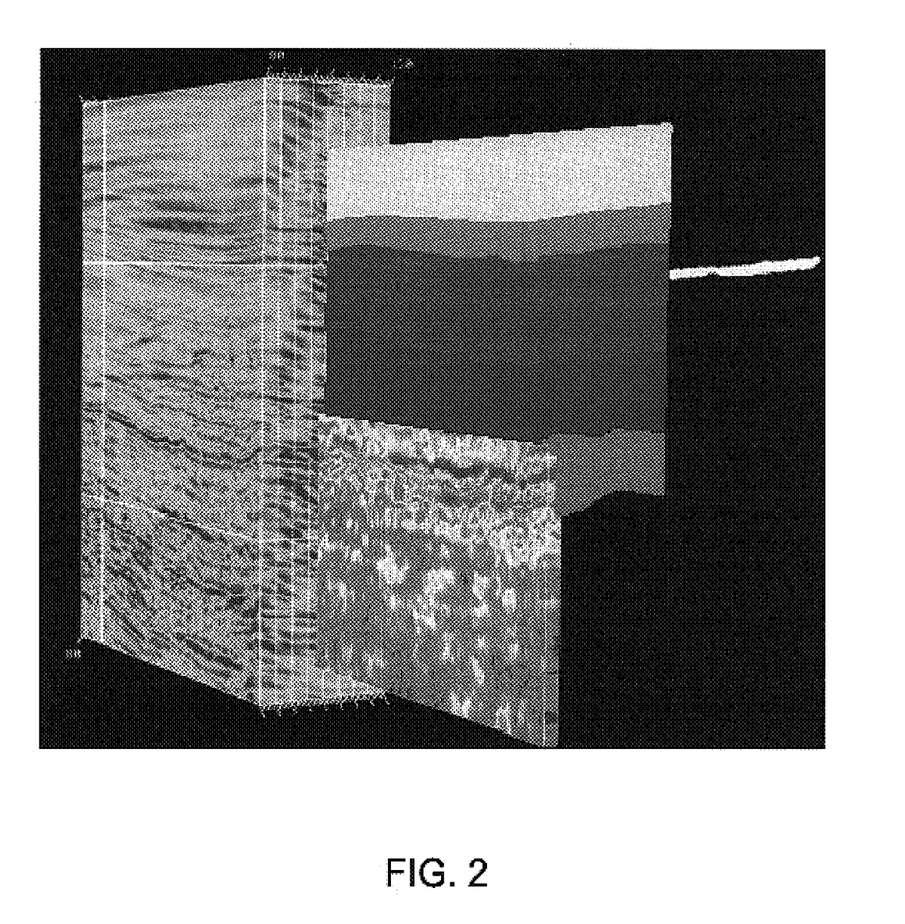
FIG. 2 shows a variable velocity function stack cube (back left), a semblance cube (bottom center) and velocity worms appearing to hang in space in the visualisation environment (top center).

FIG. 2 shows a variable velocity function stack cube (back left), a semblance cube (bottom center) and velocity worms appearing to hang in space within the visualisation environment (top center). The derived stacking velocity can be instantly quality controlled by intersecting the surface connecting the tracked velocity worms with the stacked velocity cube to build the best stack (top center). The best stack then can be cross-referenced with a variety of other data within the visualization environment, for example, interval velocity, overlaid over the real time best stack.

Aspects of the invention may generally be implemented as hardware, software or a combination thereof. In one embodiment, the inventive methods may be performed in specialized hardware, as an application-specific integrated circuit or other type of hardware implementation, or a combination of software or hardware. In another embodiment, software routines or computer programs may be executed, e.g., to make necessary calculations to determine the velocity derivatives and/or track the velocity worms of the present invention. Such software routines, when executed, transform a general-purpose computer into a specific purpose computer that aids in performing the methods of the present invention. With regard to software, various embodiments of the invention are capable of being distributed as a program product (also referred to as signal-bearing medium or computer readable medium) in a variety of forms, and that embodiments of the invention apply equally regardless of the particular type of signal-bearing media used to actually carry out the distribution. Examples of signal-bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

EXAMPLE

For the purposes of illustrating the methods of the present invention of determining velocity fields using velocity worms in a visualization environment, an example of utilizing the invention for the derivation of a stacking velocity field follows. However, one skilled in the art recognizes that other velocity fields for other purposes (listed previously in the present Detailed Description) also may be derived applying the methodologies of the present invention.

For each subsurface line for which stacking velocities are to be derived, a suite of data volumes were imported into a visualization environment. These data volumes consisted of a three-dimensional stack cube comprising raw data stacked with a range of velocities; a three-dimensional semblance cube; and additional secondary data volumes derived as attributes from the primary data volumes (for example Hilbert Attributes of the three-dimensional stack cube). The three-dimensions for all data volumes consisted of a single space axis, a time or depth axis, and a velocity axis.

Figure 3:
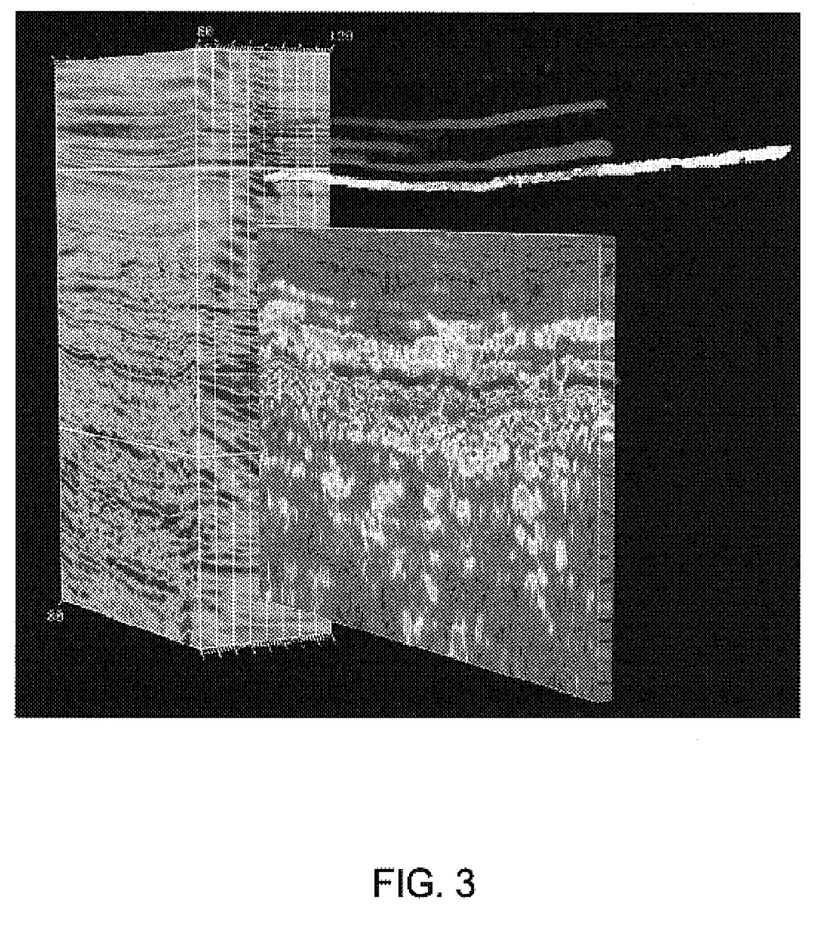
FIG. 3 shows a variable velocity function stack cube (back left), semblance cube (bottom center) and velocity worms displayed in such a way as to render them appearing to hang in space in the visualisation environment (top center).
Figure 4:
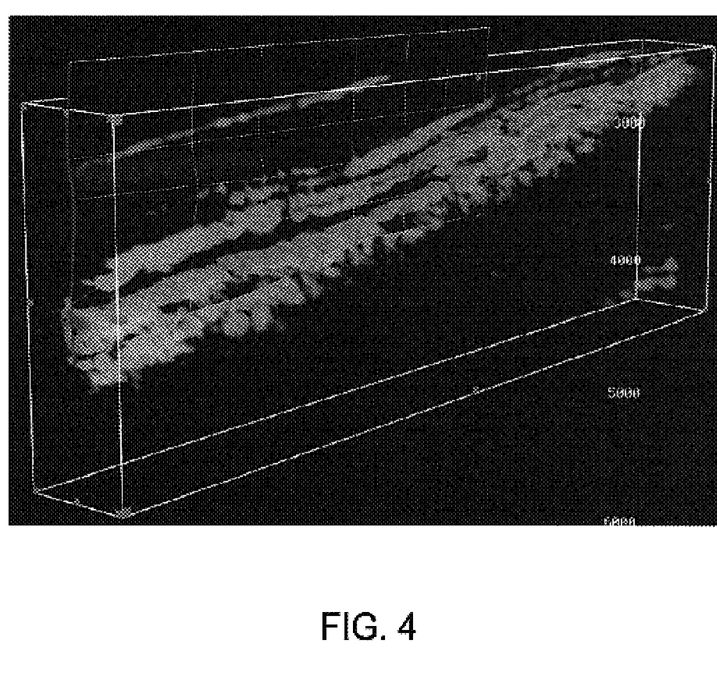
FIG. 4 shows the velocity function stack cube where all of the low amplitude semblance data has been displayed in such a way as to make the data transparent, leaving only the high amplitude semblance velocity worms visible. The velocity worms appear as continuous and semi-continuous features in a space with dimensions of offset, time or depth, and velocity and can be auto-tracked along their entire length with just a single seed point selection per velocity worm.

The semblance and/or amplitude envelope volume(s) were then displayed in such a fashion that the velocity worms corresponding to the desired stacking velocity were seen "hanging in space" in the visualization environment; see FIGS. 3 and 4. The required velocity worms were then identified within the visualization environment and tracked along their entire length. Differing velocity worms in time and space were selected and tracked until the desired velocity field or function for the desired target application was constructed.

Figure 5:
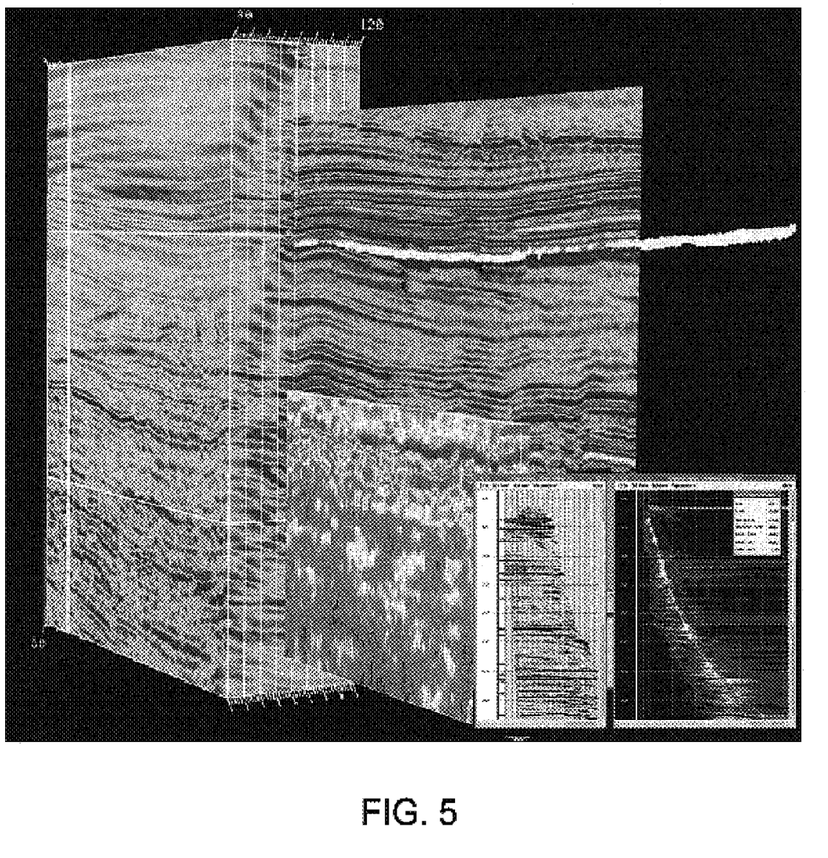
FIG. 5 shows a variable velocity function stack cube (back left), semblance cube (bottom center) and velocity worms hanging in space (right). The plane section in the top center is the stack section generated by the intersection of a surface joining the selected velocity worms and the variable velocity function stack cube.

Furthermore, the derived stacking velocity was instantly quality controlled by building a surface between the selected velocity worms and intersecting the surface with the stacked velocity cube to build the best stack in real time. The best stack then was cross-referenced with a variety of other data within the visualization environment, as may be illustrated with reference to FIG. 5. FIG. 5 shows a variable velocity function stack cube (back left), a semblance cube (bottom center) and velocity worms hanging in space (right). The plane section in the top center is the stack section generated by the intersection of the surface between the selected velocity worms and the variable velocity function stack cube. In addition, the lower right of FIG. 5 shows how the velocity worms interface with a standard velocity analysis package such that the integrity of the velocities selected can be crosschecked by the application of normal-moveout to pre-stack common mid-point gathers using the velocity worm-derived velocities.

Figure 6:
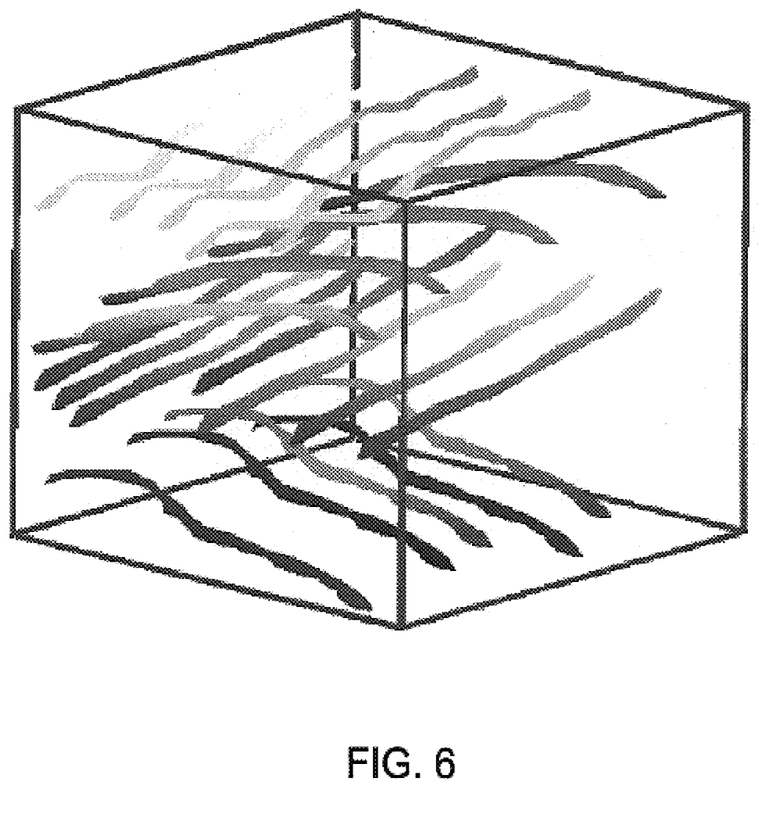
FIG. 6 shows a velocity worm cube. The cube axes are two spatial axes and one travel time axis. The velocity worms are visualized in three-dimensional space with true relative spatial position. The velocity of the worm is coded by shading, and the uncertainty in the velocity is characterized by the width of the velocity worm ribbon.

Once the velocity worms have been interpreted for a selection of velocity lines In one direction, a second set can be interpreted in a second direction; in, for example, an orthogonal direction. Alternatively, the velocity worms can be tracked around a "fence" of velocity lines in a number of directions. In the present Example, the resultant bundle of velocity worms was then visualized in three-dimensions for additional quality control purposes, as may be illustrated with reference to FIG. 6. FIG. 6 shows a velocity worm cube with two spatial axes and one travel time axis. The velocity worms are visualized in three-dimensional space with their correct spatial position. The velocity of the worm is coded by shading, and the uncertainty in the velocity is characterized by the width of the velocity worm ribbon.

Potential mis-ties at the intersection of multiple worms having differing velocities but occupying the same spatial position may be resolved within the three-dimensional worm space. The resulting worm ribbons then may be used as seed functions for tracking velocity worms in a four-dimensional space comprising two space axes a time or depth axis, and a velocity axis. The actual attribute tracked to determine the velocity could be a variety of attributes including semblance, stack amplitude, the Hilbert amplitude envelope of the variable velocity function stack cube or any other attribute or combination of attributes. Such four-dimensional worm tracking results in a velocity worm surface, or surfaces, as may be illustrated with reference to FIG. 7.

Figure 7:
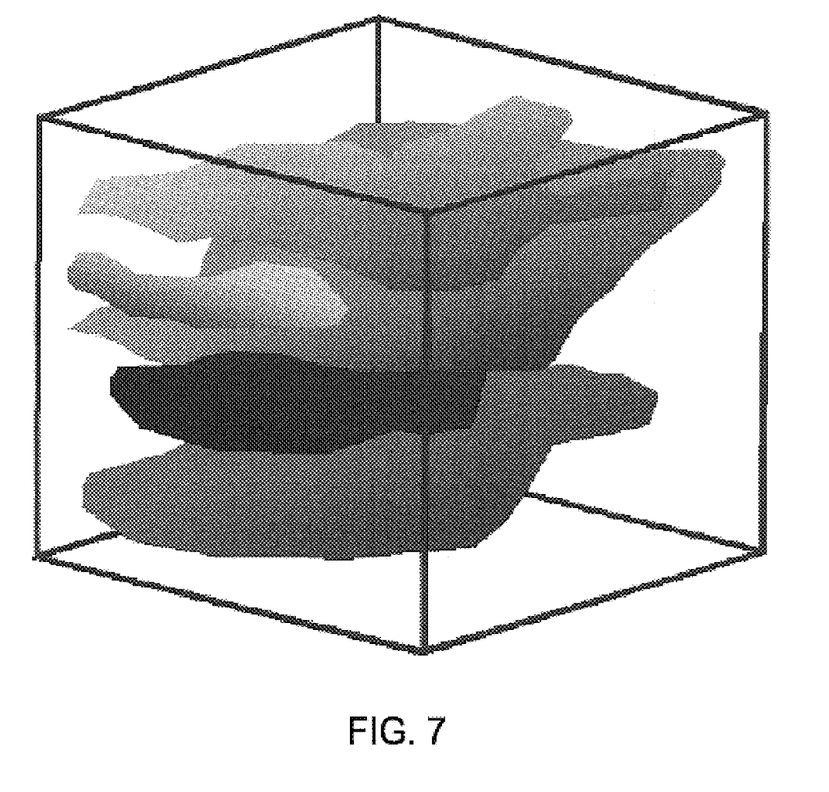
FIG. 7 illustrates velocity worm surfaces visualized in three-dimensional space with their correct spatial position. The velocity of the worm surface is coded by shading.

In FIG. 7, velocity worm surfaces were visualized in three-dimensional space with their correct spatial position, and the velocity worm surface is coded by shading. Again, velocity worm surfaces are quality controlled by cross-referencing with the variable velocity function stack cube, semblances, attributes and any other data available within the visualization environment. Once the velocity worm surfaces have been verified and quality controlled, they can be interpolated in space and time to provide a stacking velocity at every point within the three dimensional seismic survey.

Various modifications to the methodologies disclosed herein may occur to those skilled in the art, without departing from the spirit and scope of the invention as defined by the appended claims.

I claim:

1. A method for deriving a velocity field for a geophysical application, comprising:
    displaying seismic data in a visualization environment such that one or more representations that correspond to the velocity field are accentuated;
    tracking a length of the representations within the visualization environment; and
    deriving the velocity field from the tracked representations.

2. The method of claim 1, prior to displaying the seismic data, further comprising analyzing the seismic data to produce pilot velocity fields.

3. The method of claim 2, further comprising precomputing velocity stack data from the pilot velocity fields.

4. The method of claim 3, wherein precomputing the velocity stack data comprises precomputing one or more attributes derived from the velocity stack data.

5. The method of claim 2, further comprising precomputing semblance data from the pilot velocity fields.

6. The method of claim 5, wherein precomputing the semblance data comprises precomputing one or more attributes derived from the semblance data.

7. The method of claim 1, wherein the tracking further comprises tracking the representations in a three dimensional space.

8. The method of claim 7, wherein the representations are auto-tracked using a 3D conjugate gradient algorithm.

9. The method of claim 1, wherein the tracking further comprises tracking the one or more representations over a surface in four dimensions.

10. The method of claim 9, wherein the representations are auto-tracked using a 4D conjugate gradient algorithm.

11. The method of claim 1, further comprising verifying the validity of the derived velocity field.

12. The method of claim 11, wherein the verifying step comprises cross-referencing the derived velocity field to one or more data volumes within the visualization environment.

13. The method of claim 11, wherein the verifying step comprises deriving additional attributes from the derived velocity fields.

14. The method of claim 13, wherein the additional attribute is an interval velocity display.

15. The method of claim 13, wherein the additional attribute is an average velocity display.

16. The method of claim 13, wherein the additional attribute is a stacked dataset.

17. A computer program tangibly stored on a computer-readable medium, the program comprising instructions to perform an operation, comprising:

displaying seismic data in a visualization environment such that one or more representations that correspond to the velocity field are accentuated;

tracking a length of the representations within the visualization environment; and deriving the velocity field from the tracked representations.

18. The computer program of claim 17, wherein the operation further comprises, prior to displaying the seismic data, analyzing the seismic data to produce pilot velocity fields.

19. The computer program of claim 18, wherein the operation further comprises precomputing velocity stack data from the pilot velocity fields.

20. The computer program of claim 17, wherein the tracking further comprises tracking the representations in a three dimensional space.

21. The computer program of claim 20, wherein the representations are auto-tracked using a 3D conjugate gradient algorithm.

22. The computer program of claim 17, wherein the tracking further comprises tracking the one or more representations over a surface in four dimensions.

23. The computer program of claim 22, wherein the representations are auto-tracked using a 4D conjugate gradient algorithm.

24. The computer program of claim 17, wherein the operation further comprises verifying the validity of the derived velocity field.

25. The method of claim 1, wherein the representations are velocity worms.

26. The method of claim 1, wherein the geophysical application is one of migration velocity field for one of pre or post stack time or depth migration, stacking velocity field for stacking pre-stack data with pre-stack migration applied, anisotropic parameter fields, velocity fields for pore-pressure prediction, and velocity models for acoustic or elastic impedance inversion.

27. The method of claim 1, wherein the displaying step comprises displaying the seismic data such that the representations that correspond to the velocity field are hanging in a multi-dimensional space.

* * * * *